(12) United States Patent
Chen

(10) Patent No.: US 11,279,010 B2
(45) Date of Patent: Mar. 22, 2022

(54) HUB HOLDING APPARATUS

(71) Applicant: AUTEL INTELLIGENT TECHNOLOGY CORP., LTD., Guangdong (CN)

(72) Inventor: Jin Chen, Guangdong (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 32 days.

(21) Appl. No.: 16/812,793

(22) Filed: Mar. 9, 2020

(65) Prior Publication Data

US 2020/0346329 A1 Nov. 5, 2020

Related U.S. Application Data

(63) Continuation-in-part of application No. PCT/CN2018/104217, filed on Sep. 5, 2018.

(30) Foreign Application Priority Data

Sep. 8, 2017 (CN) .......................... 201721154833.9

(51) Int. Cl.
*B25B 27/00* (2006.01)
*B25B 11/00* (2006.01)
*F16B 35/06* (2006.01)
*F16B 37/00* (2006.01)

(52) U.S. Cl.
CPC .......... *B25B 27/0035* (2013.01); *B25B 11/00* (2013.01); *F16B 35/06* (2013.01); *F16B 37/00* (2013.01)

(58) Field of Classification Search
CPC ....... B25B 27/0035; B25B 11/00; F16B 35/06

USPC ........................ 29/244; 248/205.1; 33/203.18
See application file for complete search history.

(56) References Cited

U.S. PATENT DOCUMENTS

| | | | | |
|---|---|---|---|---|
| 3,990,666 A * | 11/1976 | Morrison | ............. | G01B 5/0025 248/205.1 |
| 5,024,001 A * | 6/1991 | Borner | ................... | G01B 5/255 248/205.1 |
| 7,150,105 B1 * | 12/2006 | Battaglia | ................ | G01B 5/255 33/203.18 |

(Continued)

FOREIGN PATENT DOCUMENTS

| | | |
|---|---|---|
| CN | 103063186 A | 4/2013 |
| CN | 203178081 U | 9/2013 |
| CN | 203190961 U | 9/2013 |

(Continued)

OTHER PUBLICATIONS

The Extended European Search Report dated May 4, 2021; Appln. No. 18854814.3.

*Primary Examiner* — Joseph J Hail
*Assistant Examiner* — J Stephen Taylor

(57) ABSTRACT

The present application provides a hub holding apparatus, including: a base on which a mounting hole and a receiving cavity are disposed, a center line of the mounting hole being perpendicular to a center line of the receiving cavity, and the mounting hole being in communication with the receiving cavity; a screw rotatable relative to the base; a first nut sleeved on the first threaded portion and received in the receiving cavity; and a second nut sleeved on the second threaded portion and received in the receiving cavity.

20 Claims, 3 Drawing Sheets

(56) References Cited

U.S. PATENT DOCUMENTS

2002/0170195 A1* 11/2002 Corghi .................. G01B 5/255
33/520

FOREIGN PATENT DOCUMENTS

| CN | 104226688 A | 12/2014 |
|----|-------------|---------|
| DE | 8814598 U1 | 2/1989 |
| EP | 1277547 A1 | 1/2003 |
| JP | 10293046 A | 11/1998 |
| JP | 1137747 A | 2/1999 |

* cited by examiner

HUB HOLDING APPARATUS

This application is a continuation of International Patent Application No. PCT/CN2018/104217 filed on Sep. 5, 2018, which claims priority to Chinese Patent Application No. 201721154833.9 filed on Sep. 8, 2017, both of which are incorporated by reference herein in their entireties.

BACKGROUND

Technical Field

The present application relates to the technical field of automobiles, and in particular, to a hub holding apparatus.

Related Art

During automobile maintenance (for example, four-wheel alignment, ADAS calibration), various auxiliary devices need to be mounted at a hub. An existing holding manner adopted for a hub holding apparatus is a single nut locking manner. In other words, based on one screw and one nut, when the auxiliary device needs to be held, the screw is rotated forward to drive the nut to move, so that the single nut actively moves to hold the auxiliary device. When the auxiliary device needs to be removed, the screw is rotated backward, so that a spring located between the nut and the screw separates the screw and nut apart to achieve active release.

During implementation of the present application, the inventor finds at least the following problems in the prior art: in the current single nut locking manner, it is difficult to mount the auxiliary device at the hub holding apparatus and remove the auxiliary device from the hub holding apparatus. In particular, in case of locking using a single-start nut, an uneven force is imposed on the nut as a result of a spring. Therefore, a holding center and a center hole of the hub holding apparatus are not on a reference plane, impeding insertion of the auxiliary device into the center hole of the hub holding apparatus. Similarly, during removal, due to the uneven force as a result of the spring, two sides are pushed away by different distances, resulting in great difficulty in removing the auxiliary device mounted at the center hole.

SUMMARY

In order to resolve the technical problem, embodiments of the present application provide a hub holding apparatus facilitating both mounting and removal of an auxiliary device.

In order to resolve the technical problem, the embodiments of the present application provide the following solutions:

a hub holding apparatus, including: a base on which a mounting hole and a receiving cavity are disposed, a center line of the mounting hole being perpendicular to a center line of the receiving cavity, and the mounting hole being in communication with the receiving cavity; a screw rotatable relative to the base, the screw including a first threaded portion and a second threaded portion, one end of the first threaded portion being fixedly connected to one end of the second threaded portion, and both the first threaded portion and the second threaded portion being received in the receiving cavity, a thread of the first threaded portion being disposed along a first rotation direction, and a thread of the second threaded portion being disposed along a second rotation direction, the first rotation direction and the second rotation direction being opposite to each other; a first nut sleeved on the first threaded portion and received in the receiving cavity; and a second nut sleeved on the second threaded portion and received in the receiving cavity.

In some embodiments, a thread pitch of the thread of the first threaded portion is equal to a thread pitch of the thread of the second threaded portion.

In some embodiments, the first nut has a first thread disposed along the first rotation direction, and the second nut has a second thread disposed along the second rotation direction.

In some embodiments, the screw further includes a connecting portion and a handle, another end of the second threaded portion being fixedly connected to one end of the connecting portion, and the handle being fixed to another end of the connecting portion.

In some embodiments, the hub holding apparatus further includes a first baffle plate and a second baffle plate, the first baffle plate being disposed at another end of the first threaded portion, and the second baffle plate being disposed at the another end of the second threaded portion.

In some embodiments, a limiting block is disposed on each of the first nut and the second nut, and a limiting groove is disposed on an inner side surface of the receiving cavity, a center line of the limiting groove being parallel to a center line of the receiving cavity; and the limiting block of the first nut and the limiting block of the second nut are both embedded in the limiting groove and are slidable in the limiting groove.

In some embodiments, the first nut and the second nut are both hexagon nuts, and a cross-sectional shape of the receiving cavity is a hexagon.

In some embodiments, the hub holding apparatus further includes a bracket, where the base is fixed to the bracket, and the bracket may be mounted at a hub.

In some embodiments, the bracket includes a first mounting portion, a second mounting portion, a connecting rod, and a threaded rod; where there are two connecting rods, one end of one of the connecting rods being fixedly connected to one end of the other of the connecting rods, and another end of one of the connecting rods being fixedly connected to another end of the other of the connecting rods; the first mounting portion is sleeved on one end of each of the two connecting rods respectively and may slide on the two connecting rods; the second mounting portion is sleeved on the another end of each of the two connecting rods respectively and may slide on the two connecting rods; and the threaded rod is rotatably connected to the first mounting portion and the second mounting portion.

In some embodiments, a rotational handle is disposed on one end of the threaded rod, where rotating the rotational handle may drive the threaded rod to rotate, and during the rotation, the first mounting portion and the second mounting portion approach to or move away from each other along the two connecting rods.

Compared to the prior art, in the hub holding apparatus in the embodiments of the present application, two nuts are sleeved on a screw, and when the screw is rotated, the two nuts approach to or move away from each other along the screw. Based on the structure, the auxiliary device is quickly and conveniently mounted at the hub holding apparatus, and the auxiliary device can be easily removed from the hub holding apparatus.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding this application, this application is described in further detail below with reference to the accompanying drawings and detailed description. It should be noted that an element described as being "fixed" to another element may be directly on the other element, or one or more intervening components may be present. An element described as being "connected" to another element may be directly connected to the other element, or one or more intervening components may be present. As used in the specification, orientation or position relationships indicated by the terms such as "upper", "lower", "inside", "outside" and "bottom" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of this application. In addition, the terms such as "first", "second", and "third" are used only for the purpose of description, and should not be understood as indicating or implying relative importance.

Unless otherwise defined, all technical and scientific terms used herein have the same meaning as commonly understood by one of ordinary skill in the art to which this application belongs. The terms used in the specification of this application are merely used for describing specific embodiments, and are not intended to limit this application. As used herein, the term "and/or" includes any and all combinations of one or more related items listed.

In addition, the technical features provided in different embodiments of this application to be described below may be combined with each other as long as no conflict occurs.

Figure 1:
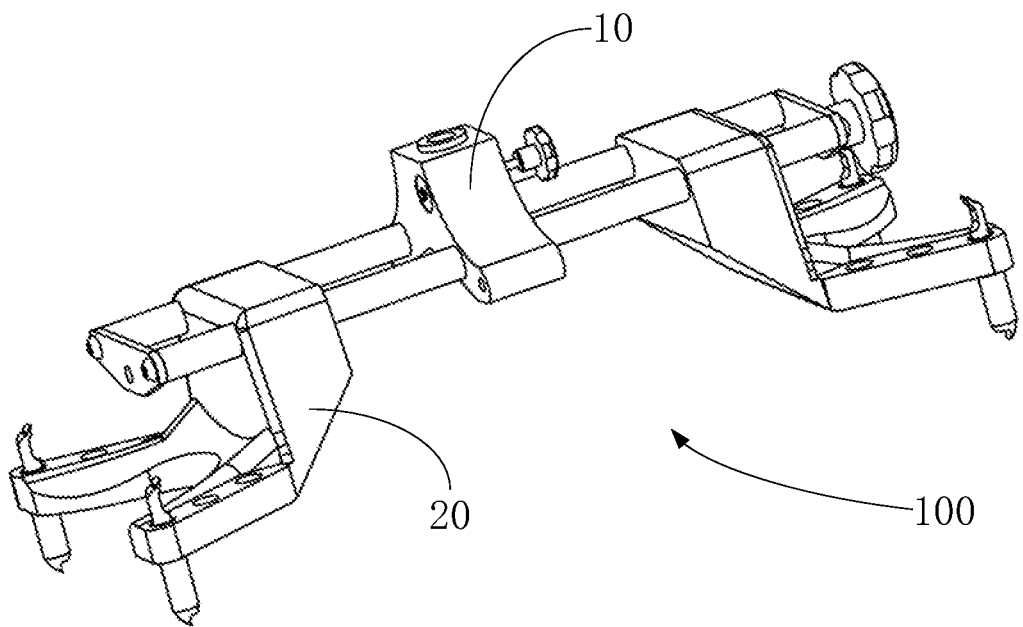
FIG. 1 is a three-dimensional schematic structural diagram of a hub holding apparatus according to an embodiment of the present application.
Figure 2:
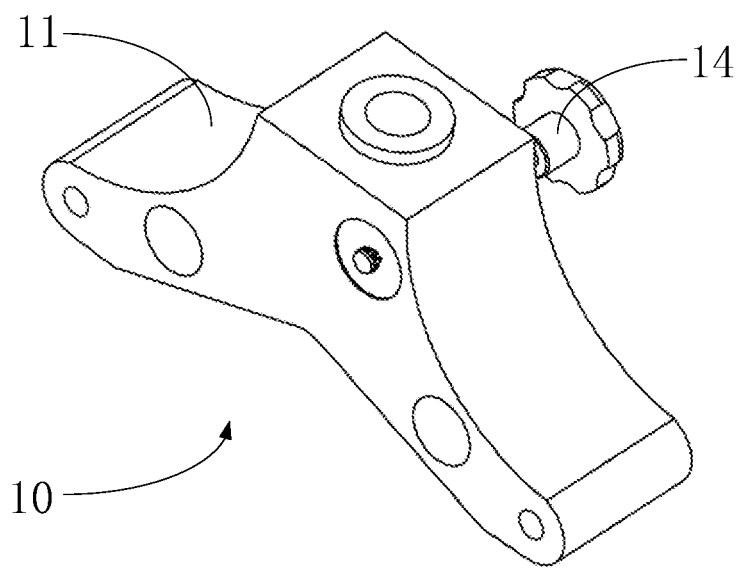
FIG. 2 is a three-dimensional schematic structural diagram of a mounting assembly in the hub holding apparatus shown in FIG. 1.
Figure 3:
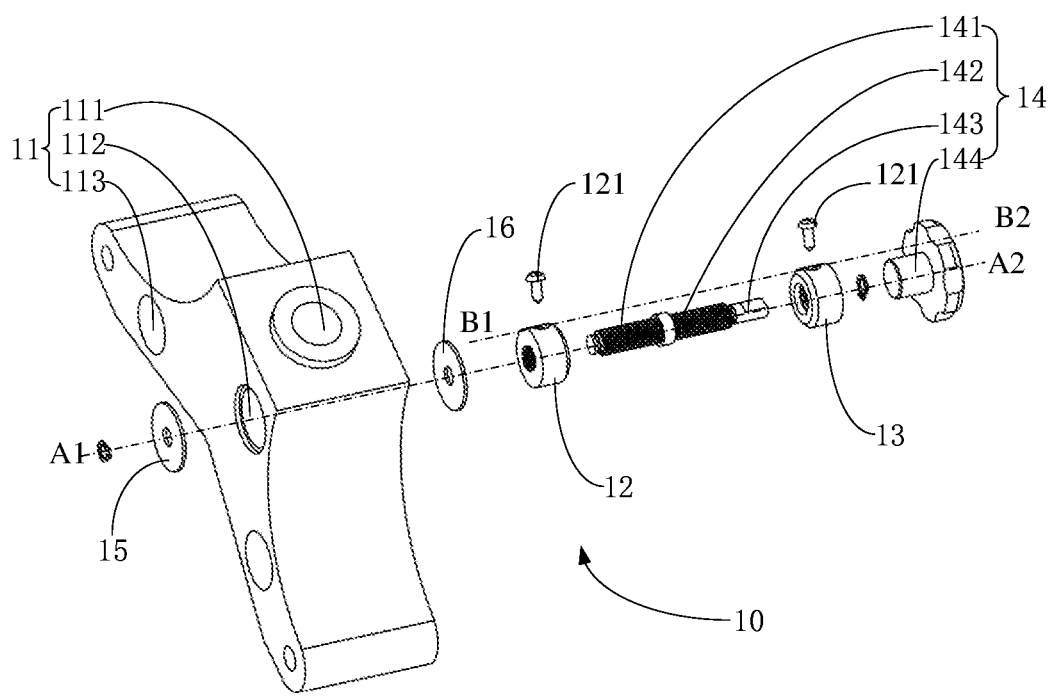
FIG. 3 is an exploded view of the mounting assembly in the hub holding apparatus shown in FIG. 2.

Referring to FIG. 1 to FIG. 3 together, an embodiment of the present application provides a hub holding apparatus 100, including a mounting assembly 10 and a bracket 20. The mounting assembly 10 is mounted at the bracket 20 and is configured to mount an auxiliary device.

The mounting assembly 10 includes a base 11, a first nut 12, a second nut 13 and a screw 14. A mounting hole 111 and a receiving cavity 112 are disposed on the base 11. The mounting hole 111 and the receiving cavity 112 are both cylindrical. A center line of the mounting hole 111 is perpendicular to a center line of the receiving cavity 112, and the mounting hole 111 is in communication with the receiving cavity 112. The first nut 12 and the second nut 13 are sleeved on the screw 14, and one end of each of the first nut 12, the second nut 13 and the screw 14 is received in the receiving cavity 112. The screw 14 is rotatable relative to the base 11.

Figure 4:
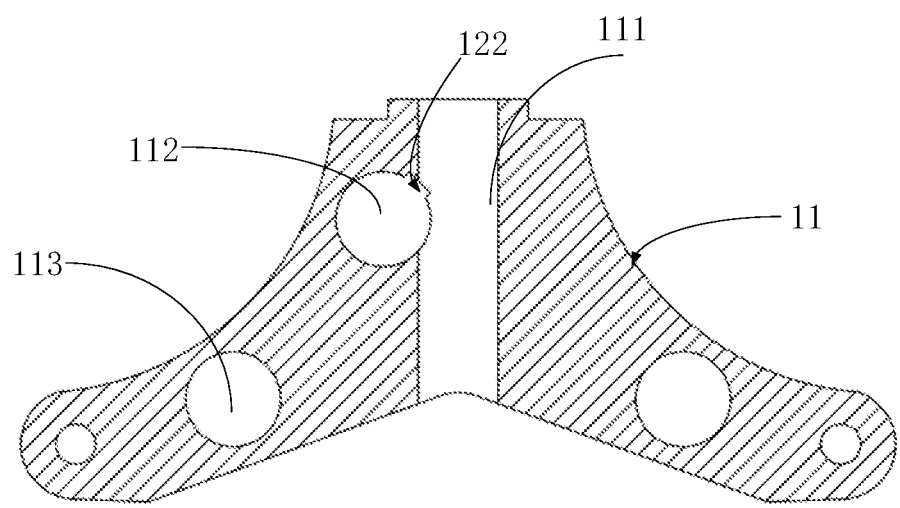
FIG. 4 is a cross-sectional view of the mounting assembly in the hub holding apparatus shown in FIG. 2.

Referring to FIG. 4, in particular, the mounting hole 111 is disposed on a mounting surface of the base 11 for mounting an auxiliary device. The receiving cavity 112 is disposed on the base 11 and penetrates from one side to the other side of the base 11 (that is, the receiving cavity 112 is a through hole). The mounting hole 111 and the receiving cavity 112 are both cylindrical. A center line of the mounting hole 111 is perpendicular to a center line of the receiving cavity 112, and the mounting hole 111 is in communication with the receiving cavity 112. A fixing hole 113 is further disposed on the base 11. The fixing hole 113 penetrates from one side of the base 11 to the other side (that is, the fixing hole 113 is a through hole).

The first nut 12 has a first thread disposed along a first rotation direction, and the second nut 13 has a second thread disposed along a second rotation direction. The first rotation direction and the second rotation direction are opposite to each other. A thread pitch of the first thread is equal to a thread pitch of the second thread.

It may be understood that, in this embodiment, the first rotation direction is a clockwise direction, and the second rotation direction is a counterclockwise direction. In some other embodiments, the first rotation direction is a counterclockwise direction, and the second rotation direction is a clockwise direction.

It may be understood that, in other embodiments, the first nut 12 and the second nut 13 may be of a same type, which may be mounted at the screw 14 in opposite directions.

The screw 14 includes a first threaded portion 141, a second threaded portion 142, a connecting portion 143, and a handle 144. One end of the first threaded portion 141 is fixedly connected to one end of the second threaded portion 142, another end of the second threaded portion 142 is fixedly connected to one end of the connecting portion 143, and the handle 144 is fixed to another end of the connecting portion 143.

The first threaded portion 141 and the second threaded portion 142 are both cylindrical, and both the first threaded portion 141 and the second threaded portion 142 have a thread on outer surfaces thereof. The thread of the first threaded portion 141 is disposed along a first rotation direction, and the thread of the second threaded portion 142 is disposed along a second rotation direction. The first rotation direction and the second rotation direction are opposite to each other. A thread pitch of the thread of the first threaded portion 141 is equal to a thread pitch of the thread and the second threaded portion 142.

The first nut 12 is sleeved on the first threaded portion 141 of the screw 14. When the screw 14 is rotated, the first nut 12 may be rotated relative to the screw 14, and during the rotation, the first nut 12 moves along an axial direction of the screw 14. The second nut 13 is sleeved on the second threaded portion 142 of the screw 14. When the screw 14 is rotated, the second nut 13 may be rotated relative to the screw 14, and during the rotation, the second nut 13 moves along the axial direction of the screw 14. Because the threads of the first threaded portion 141 and the second threaded portion 142 rotate in opposite directions and have a same thread pitch, during the rotation of the screw 14, the first nut 12 and the second nut 13 approach to or move away from each other.

In this embodiment, when the screw 14 is rotated along the first rotation direction, the first nut 12 and the second nut 13 approach to each other; or when the screw 14 is rotated in the second rotation direction, the first nut 12 and the second nut 13 move away from each other. When the auxiliary device needs to be mounted at the hub holding apparatus 100, a mounting shaft of the auxiliary device is first inserted into the mounting hole 111, and then the screw 14 is rotated in the first rotation direction. Because the thread of the first threaded portion 141 and the thread of the second threaded portion 142 have an equal thread pitch, the first nut 12 and the second nut 13 move in opposite directions by an equal movement distance, so that a pressing force is generated from both the first nut 12 and the second nut 13 for locking and fixing the mounting shaft of the auxiliary device.

When the auxiliary device needs to be removed from the hub holding apparatus 100, the screw 14 is rotated along the second rotation direction, so that the first nut 12 and the second nut 13 move away from each other. Because the thread of the first threaded portion 141 and the thread of the second threaded portion 142 have an equal thread pitch, the first nut 12 and the second nut 13 move in opposite directions by an equal movement distance. When the first nut 12 and the second nut 13 move to a specific position, the pressing force of the first nut 12 and the second nut 13 on the mounting shaft of the auxiliary device disappears. In this case, the mounting shaft of the auxiliary device may be pulled out from the mounting hole 111 to complete removal.

The mounting assembly 10 further includes a first baffle plate 15 and a second baffle plate 16, the first baffle plate 15 being disposed at another end of the first threaded portion 141, and the second baffle plate 16 being disposed at the another end of the second threaded portion 142. The first baffle plate 15 and the second baffle plate 16 are both used for limiting, and are configured to prevent the first nut 12 and the second nut 13 from being separated from the screw 14 during the rotation of the screw 14.

Referring to FIGS. 3 and 4, a limiting block 121 is disposed on each of the first nut 12 and the second nut 13, and a limiting groove 122 (shown in FIG. 4) is disposed on an inner inside surface of the receiving cavity 112. The limiting groove 122 is parallel to the center line A1A2 of the receiving cavity 112. The limiting block 121 of the first nut 12 and the limiting block 121 of the second nut 13 are both embedded in the limiting groove 122 and may slide in the limiting groove 122. The structure is designed to prevent the first nut 12 and the second nut 13 from rotating with the screw 14 (that is, when the screw 14 is rotated relative to the base 11, the first nut 12 and the second nut 13 do not rotate, but move along the axial direction of the screw 14).

In this embodiment, the limiting block 121 may be a bolt or a screw. A threaded hole is disposed on a side surface of each of the first nut 12 and the second nut 13. One end of the bolt or the screw is screwed into the threaded hole, and another end protrudes from each of the first nut 12 and the second nut 13 for limiting.

It may be understood that, in other embodiments, the first nut 12 and the second nut 13 may both be hexagon nuts, and a cross-sectional shape of the receiving cavity 112 is a hexagon to prevent the first nut 12 and the second nut 13 from rotating relative to the base 11 (that is, there is a limiting structure among the first nut 12, the second nut 13 and the receiving cavity 112 for preventing the first nut 12 and the second nut 13 from rotating relative to the base 11).

Figure 5:
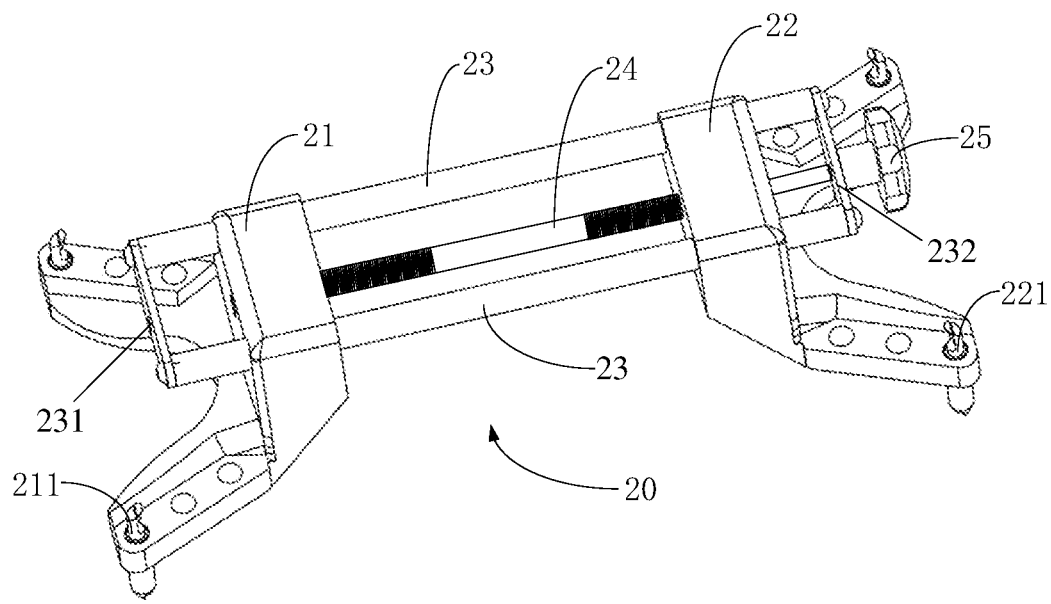
FIG. 5 is a three-dimensional diagram of a bracket in the hub holding apparatus shown in FIG. 1.

Referring to FIG. 5, the bracket 20 includes a first mounting portion 21, a second mounting portion 22, a connecting rod 23, a threaded rod 24, and a rotatable handle 25. There are two connecting rods 23, one end of one of the connecting rods 23 being fixedly connected to one end of the other of the connecting rods 23 via a first fixed plate 231, and another end of one of the connecting rods 23 being fixedly connected to another end of the other of the connecting rods 23 via a second fixed plate 232. The two connecting rods 23 are parallel to each other. The first mounting portion 21 is sleeved on one end of each of the two connecting rods 23 respectively and is slidable on the two connecting rods 23; and the second mounting portion 22 is sleeved on another end of each of the two connecting rods 23 respectively and is slidable on the two connecting rods 23. A first threaded hole (not shown) is disposed on the first mounting portion 21, and a second threaded hole (not shown) is disposed on the second mounting portion 22. The threaded rod 24 passes through the first threaded hole and second threaded hole respectively.

The rotatable handle 25 is fixed to one end of the threaded rod 24, and rotating the rotating handle 25 may drive the threaded rod 24 to rotate. During the rotation, the first mounting portion 21 and the second mounting portion 22 approach to or move away from each other along the two connecting rods 23. A first engaging post 211 for engaging a hub is disposed on the first mounting portion 21, and there are two first engaging posts 211 in total. A second engaging post 221 for engaging a hub is disposed on the second mounting portion 22, and there are two second engaging posts 221 in total.

Figure 6:
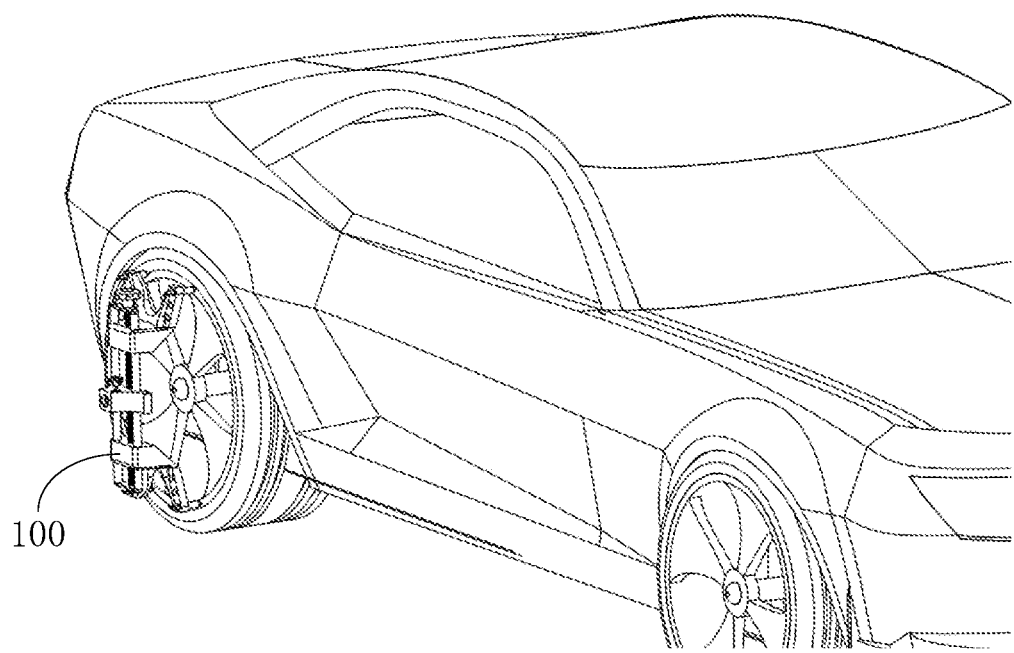
FIG. 6 is a status diagram of the hub holding apparatus shown in FIG. 1 in use.

Referring to FIG. 6, rotating the threaded rod 24 may drive the first mounting portion 21 and the second mounting portion 22 to approach to each other, so that the first engaging post 211 and the second engaging post 221 both hold the hub, thereby fixedly connecting the bracket 20 to the hub.

In the hub holding apparatus 100 in the embodiments of the present application, two nuts (12, 13) are sleeved on a screw 14, and when the screw 14 is rotated, the two nuts (12, 13) approach to or move away from each other along the screw 14. Based on the structure, the auxiliary device is quickly and conveniently mounted at the hub holding apparatus 100, and the auxiliary device is extremely easily removed from the hub holding apparatus 100.

It should be finally noted that the above embodiments are merely intended for describing the technical solutions of this application rather than limiting this application. Based on the idea of this application, the technical features in the foregoing embodiments or different embodiments may be combined, the steps may be implemented in any order, and many other changes in the different aspects of the present invention as described above may exist. For brevity, such changes are not provided in the detailed descriptions. Although this application is described in detail with reference to the foregoing embodiments, those of ordinary skill in the art should understand that they can still make modifications to the technical solutions described in the foregoing embodiments or make equivalent substitutions to some technical features thereof, without departing from scope of the technical solutions of the embodiments of this application.

What is claimed is:

1. A hub holding apparatus, comprising:
   a base on which a mounting hole and a receiving cavity are disposed, a center line of the mounting hole being perpendicular to a center line of the receiving cavity, and the mounting hole being in communication with the receiving cavity;

a screw rotatable relative to the base, the screw comprising a first threaded portion and a second threaded portion, one end of the first threaded portion being fixedly connected to one end of the second threaded portion, and both the first threaded portion and the second threaded portion being received in the receiving cavity, a thread of the first threaded portion being disposed along a first rotation direction, and a thread of the second threaded portion being disposed along a second rotation direction, the first rotation direction and the second rotation direction being opposite to each other;

a first nut sleeved on the first threaded portion and received in the receiving cavity; and a second nut sleeved on the second threaded portion and received in the receiving cavity.

2. The hub holding apparatus according to claim 1, wherein a thread pitch of the thread of the first threaded portion is equal to a thread pitch of the thread of the second threaded portion.

3. The hub holding apparatus according to claim 1, wherein the first nut has a first thread disposed along the first rotation direction; and the second nut has a second thread disposed along the second rotation direction.

4. The hub holding apparatus according to claim 1, wherein the screw further comprises a connecting portion and a handle, another end of the second threaded portion being fixedly connected to one end of the connecting portion, and the handle being fixed to another end of the connecting portion.

5. The hub holding apparatus according to claim 4, wherein the hub holding apparatus further comprises a first baffle plate and a second baffle plate, the first baffle plate being disposed at another end of the first threaded portion, and the second baffle plate being disposed at the another end of the second threaded portion.

6. The hub holding apparatus according to claim 1, wherein a limiting block is disposed on each of the first nut and the second nut, and a limiting groove is disposed on an inner side surface of the receiving cavity, a center line of the limiting groove being parallel to a center line of the receiving cavity; and the limiting block of the first nut and the limiting block of the second nut are both embedded in the limiting groove and are slidable in the limiting groove.

7. The hub holding apparatus according to claim 1, wherein the first nut and the second nut are both hexagon nuts, and a cross-sectional shape of the receiving cavity is a hexagon.

8. The hub holding apparatus according to claim 1, wherein the hub holding apparatus further comprises a bracket, wherein the base is fixed to the bracket, and the bracket may be mounted at a hub.

9. The hub holding apparatus according to claim 8, wherein the bracket comprises a first mounting portion, a second mounting portion, a connecting rod, and a threaded rod; wherein there are two connecting rods, one end of one of the connecting rods being fixedly connected to one end of the other of the connecting rods via a first fixed plate, and another end of one of the connecting rods being fixedly connected to another end of the other of the connecting rods via a second fixed plate:

the first mounting portion is sleeved on one end of each of the two connecting rods respectively and may slide on the two connecting rods;

the second mounting portion is sleeved on the another end of each of the two connecting rods respectively and may slide on the two connecting rods; and the threaded rod is rotatably connected to the first mounting portion and the second mounting portion.

10. The hub holding apparatus according to claim 9, wherein a rotational handle is disposed on one end of the threaded rod, wherein rotating the rotational handle drive the threaded rod to rotate, and during the rotation, the first mounting portion and the second mounting portion approach to or move away from each other along the two connecting rods.

11. A hub holding apparatus, comprising:

a base on which a mounting hole and a receiving cavity are disposed, a center line of the mounting hole being perpendicular to a center line of the receiving cavity, and the mounting hole being in communication with the receiving cavity; and a screw rotatable relative to the base, the screw comprising a first threaded portion and a second threaded portion, one end of the first threaded portion being fixedly connected to one end of the second threaded portion, and both the first threaded portion and the second threaded portion being received in the receiving cavity, a thread of the first threaded portion being disposed along a first rotation direction, and a thread of the second threaded portion being disposed along a second rotation direction, the first rotation direction and the second rotation direction being opposite to each other;

wherein a thread pitch of the thread of the first threaded portion is equal to a thread pitch of the thread of the second threaded portion.

12. The hub holding apparatus according to claim 11, further comprising:

a first nut sleeved on the first threaded portion and received in the receiving cavity.

13. The hub holding apparatus according to claim 12, further comprising:

a second nut sleeved on the second threaded portion and received in the receiving cavity.

14. The hub holding apparatus according to claim 13, wherein the first nut has a first thread disposed along the first rotation direction; and the second nut has a second thread disposed along the second rotation direction.

15. The hub holding apparatus according to claim 11, wherein the screw further comprises a connecting portion and a handle, another end of the second threaded portion being fixedly connected to one end of the connecting portion, and the handle being fixed to another end of the connecting portion.

16. The hub holding apparatus according to claim 15, further comprises a first baffle plate and a second baffle plate, the first baffle plate being disposed at another end of the first threaded portion, and the second baffle plate being disposed at the another end of the second threaded portion.

17. A hub holding apparatus, comprising:
- a base on which a mounting hole and a receiving cavity are disposed, a center line of the mounting hole being perpendicular to a center line of the receiving cavity, and the mounting hole being in communication with the receiving cavity;
- a screw rotatable relative to the base, the screw comprising a first threaded portion and a second threaded portion, one end of the first threaded portion being fixedly connected to one end of the second threaded portion, and both the first threaded portion and the second threaded portion being received in the receiving cavity, a thread of the first threaded portion being disposed along a first rotation direction, and a thread of the second threaded portion being disposed along a second rotation direction, the first rotation direction and the second rotation direction being opposite to each other.

18. The hub holding apparatus according to claim 17, further comprising:
- a first nut sleeved on the first threaded portion and received in the receiving cavity, and
- a second nut sleeved on the second threaded portion and received in the receiving cavity.

19. The hub holding apparatus according to claim 18, further comprising:
- a first baffle plate and a second baffle plate, the first baffle plate being disposed at another end of the first threaded portion, and the second baffle plate being disposed at the another end of the second threaded portion.

20. The hub holding apparatus according to claim 17, wherein
a thread pitch of the thread of the first threaded portion is equal to a thread pitch of the thread of the second threaded portion.

* * * * *